(12) United States Patent
Aibester et al.

(10) Patent No.: US 11,516,135 B2
(45) Date of Patent: Nov. 29, 2022

(54) GLOBAL POLICERS

(71) Applicant: MELLANOX TECHNOLOGIES TLV LTD., Raanana (IL)

(72) Inventors: Niv Aibester, Herzliya (IL); Aviv Kfir, Nili (IL); Gil Levy, Hod Hasharon (IL); Liron Mula, Ramat Gan (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 20 days.

(21) Appl. No.: 16/746,879

(22) Filed: Jan. 19, 2020

(65) Prior Publication Data

US 2021/0226895 A1     Jul. 22, 2021

(51) Int. Cl.
| | | |
|---|---|---|
| *H04L 41/16* | (2022.01) | |
| *H04L 47/20* | (2022.01) | |
| *H04L 47/32* | (2022.01) | |
| *H04L 47/783* | (2022.01) | |
| *H04L 47/2441* | (2022.01) | |

(52) U.S. Cl.
CPC .......... *H04L 47/20* (2013.01); *H04L 47/2441* (2013.01); *H04L 47/32* (2013.01); *H04L 47/783* (2013.01)

(58) Field of Classification Search
None
See application file for complete search history.

(56) References Cited

U.S. PATENT DOCUMENTS

| | | | |
|---|---|---|---|
| 7,307,949 B1* | 12/2007 | Washburn | H04L 47/10 370/230 |
| 8,867,356 B2 | 10/2014 | Bloch et al. | |
| 9,160,668 B2 | 10/2015 | Tripathi et al. | |
| 10,079,782 B2 | 9/2018 | Haramaty et al. | |
| 10,200,294 B2 | 2/2019 | Shpiner et al. | |
| 2006/0221819 A1* | 10/2006 | Padwekar | H04L 47/10 370/410 |
| 2009/0109847 A1* | 4/2009 | Stephenson | H04W 28/02 370/232 |
| 2010/0260048 A1* | 10/2010 | Dolganow | H04L 43/028 370/235 |
| 2015/0373546 A1* | 12/2015 | Haugen | H04L 41/0869 726/22 |
| 2016/0072674 A1* | 3/2016 | Nolan | H04L 41/0816 709/221 |

(Continued)

OTHER PUBLICATIONS

Wikipedia, "Virtual Extensible LAN", pp. 1-2, Nov. 16, 2019.

(Continued)

*Primary Examiner* — Brandon M Renner
(74) *Attorney, Agent, or Firm* — Kligler & Associates Patent Attorneys Ltd

(57) ABSTRACT

Apparatus for global policing of a bandwidth of a flow, the apparatus including a network device including a local policer configured to perform bandwidth policing on the flow within the network device, and a communications module configured to: send local policer state information from the local policer to a remote global policer, and receive policer state information from the remote global policer and update the local policer state information based on the remote global policer state information, Related apparatus and methods are also provided.

21 Claims, 3 Drawing Sheets

(56) References Cited

U.S. PATENT DOCUMENTS

| | | | |
|---|---|---|---|
| 2016/0088020 A1* | 3/2016 | Chan | G06F 16/22 |
| | | | 726/1 |
| 2016/0142322 A1* | 5/2016 | Atluri | H04L 29/0854 |
| | | | 370/230 |
| 2016/0191406 A1* | 6/2016 | Xiao | H04L 45/38 |
| | | | 370/235 |
| 2017/0026263 A1* | 1/2017 | Gell | H04L 67/1023 |
| 2018/0091388 A1 | 3/2018 | Levy et al. | |
| 2019/0182122 A1* | 6/2019 | Kushnir | H04L 29/08 |
| 2020/0192336 A1* | 6/2020 | Wang | G05B 19/4184 |

OTHER PUBLICATIONS

Owokade., "Traffic Policing vs. Traffic Shaping", ConfiguialionTips, Engineer Tools, Routing, pp. 1-15, Jun. 13, 2018.

Qi et al., "Design of a Novel Statistics Counter Architecture with Optimal Space and Time Efficiency", SIGMetrics/Performance, Saint Malo, France, pp. 1-12, Jun. 26-30, 2006.

Ramabhadran et al., "Efficient Implementation of a Statistics Counter Architecture", SIGMETRICS, pp. 1-11, San Diego, USA, Jun. 10-14, 2003.

Heinanen et al., "A Single Rate Three Color Marker", Request for Comments: 2697, pp. 1-6, Sep. 1999.

Wikipedia, "Traffic policing (communications)", pp. 1-3, Aug. 7, 2019.

\* cited by examiner

GLOBAL POLICERS

FIELD OF THE INVENTION

The present invention relates to traffic policing, including, inter alia, bandwidth policing.

BACKGROUND OF THE INVENTION

Traffic policing is a process of monitoring network traffic for compliance with a traffic contract and taking steps to enforce that contract. Traffic policing, which is generally carried out by an entity called a "traffic policer", may include discarding network traffic, such as network packets, which exceed an allowed maximum which has been defined for network traffic, such as, by way of non-limiting example, an allowed maximum bandwidth. Generally, when a traffic policer is found on a network element (which term, as used herein, may refer, by way of non-limiting example to a switch or to a host channel adapter) the traffic policer acts locally, in accordance with what is taking place on that network element, and without regard to more global network traffic considerations.

SUMMARY OF THE INVENTION

The present invention, in certain embodiments thereof, seeks to provide an improved system for bandwidth policing, including global bandwidth policing.

There is thus provided in accordance with an exemplary embodiment of the present invention apparatus for global policing of a bandwidth of a flow, the apparatus including a network device including a local policer configured to perform bandwidth policing on the flow within the network device, and a communications module configured to: send local policer state information from the local policer to a remote global policer, and receive policer state information from the remote global policer and update the local policer state information based on the remote global policer state information.

Further in accordance with an exemplary embodiment of the present invention the network device includes a switch.

Still further in accordance with an exemplary embodiment of the present invention the network device includes a network interface controller (NIC).

Additionally in accordance with an exemplary embodiment of the present invention the flow includes a plurality of flows, the local policer includes a plurality of local policers, each associated with one of the plurality of flows, and the communications module is configured to: send local policer state information from each local policer to a corresponding remote global policer, and receive policer state information from each remote global policer and update the corresponding local policer state information based on the corresponding remote poker state information.

There is also provided in accordance with another exemplary embodiment of the present invention apparatus for global policing of a bandwidth of a flow, the apparatus including a network device including a global policer configured to perform bandwidth policing on flows within a plurality of network devices, and a communications module configured to: receive local policer state information from a least one local poker included in another network device, and pass the received local policer state information to the global policer, and send policer state information from the global policer to the at least one local policer for updating local policer state information based on the global policer state information.

Further in accordance with an exemplary embodiment of the present invention the flow includes a plurality of flows, the local policer includes a plurality of local policers, each associated with one of the plurality of flows, and the communications module is configured to receive local policer state information from each local policer, and pass the received local policer state information to a corresponding global policer, and send policer state information from each global policer to each the local policer for updating local policer state information based on the corresponding global policer state information.

Still further in accordance with an exemplary embodiment of the present invention the global policer is configured, in performing the bandwidth policing on flows with a plurality of network devices, to maintain a policing quota and a current level for each of the flows, to adjust the current level based on the received local policer state information, and to provide new policing quota information to the communications module as part of the policer state information.

There is also provided in accordance with another exemplary embodiment of the present invention a method for global policing of a bandwidth of a flow, in which a communications module, associated with a network device including a local policer is configured to perform bandwidth policing on the flow within the network device, the method including the communications module performing the following: sending local policer state information from the local policer to a remote global policer, and receiving policer state information from the remote global policer and updating the local policer state information based on the remote global policer state information.

Further in accordance with an exemplary embodiment of the present invention the network device includes a switch.

Still further in accordance with an exemplary embodiment of the present invention the network device includes a network interface controller (NIC).

Additionally in accordance with an exemplary embodiment of the present invention the flow includes a plurality of flows, the local policer includes a plurality of local policers, each associated with one of the plurality of flows, and the communications module performs the following: sends local policer state information from each local policer to a corresponding remote global policer, and receives policer state information from each remote global policer and updates the corresponding local policer state information based on the corresponding remote policer state information.

There is also provided in accordance with another exemplary embodiment of the present invention a method for global policing of a bandwidth of a flow, in which a commutations module is associated with a network device including a global policer configured to perform bandwidth policing on flows within a plurality of network devices, the method including the communications module performing the following: receiving local policer state information from a least one local policer included in another network device, and passing the received local policer state information to the global policer, and sending global policer state information from the global policer to the at least one local policer for updating local policer state information based on the global policer state information.

Further in accordance with an exemplary embodiment of the present invention the flow includes a plurality of flows, the local policer includes a plurality of local policers, each associated with one of the plurality of flows, and the communications module performs the following: receives local policer state information from each local policer, and passes the received local policer state information to a corresponding global policer, and sends policer state information from each global policer to each the local policer for updating local policer state information based on the corresponding global policer state information.

Still further in accordance with an exemplary embodiment of the present invention the global policer, in performing the bandwidth policing on flows with a plurality of network devices: maintains a policing quota and a current level for each of the flows, adjusts the current level based on the received local policer state information, and provides new policing quota information to the communications module as part of the policer state information.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

As described above, traffic policing is a process of monitoring network traffic for compliance with a traffic contract and taking steps to enforce that contract. Traffic policing; which is generally carried out by an entity called a "traffic policer", may include taking actions on network traffic (which actions may include, by way of non-limiting example, marking said network traffic or discarding said network traffic) which exceed an allowed maximum, such as an allowed maximum bandwidth. The network traffic may, by way of non-limiting example, include network packets.

As described above, a traffic policer may police traffic on a network element; without limiting the generality of the foregoing and for purposes of simplicity of description, policing on a network switch may be described herein. Generally, when a traffic policer is found on a network switch, the traffic policer acts locally, in accordance with what is taking place on that network switch, and without regard to more global network traffic considerations. (It might be possible, in existing systems, to allow global policing, but this would require software intervention with increased complexity and decreased performance). Furthermore, the policer may act on ("be bound to") traffic on a particular ingress or egress port; on traffic of a particular packet or flow type; or may act based on switch internal state (in accordance with internal timers [to allow fine-grained control, such as for burst traffic] or with presently available resources). The present invention, in exemplary embodiments thereof, seeks to provide an improved system for bandwidth policing, including global bandwidth policing; with global bandwidth policing, global network considerations, not merely considerations on a particular switch, are taken into account; in other words, considerations taken into account in deciding whether to pass or to drop a particular packet are based on aggregated information across a fabric of switches, with the resulting considerations being passed to the individual switches.

Figure 1:
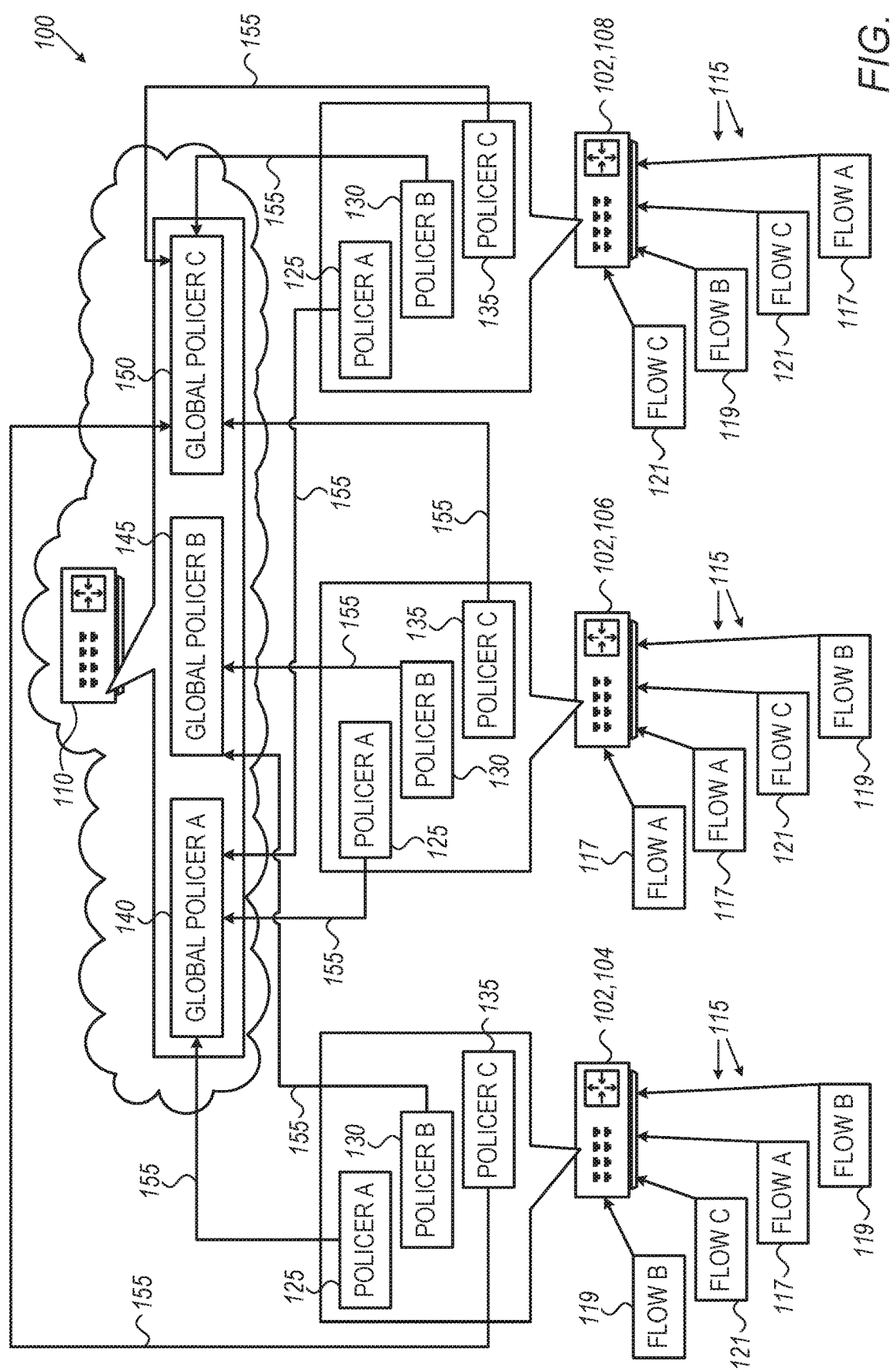
FIG. 1 is a simplified partly pictorial, partly block-diagram illustration of a bandwidth policing system, constructed and operative in accordance with an exemplary embodiment of the present invention, the illustration depicting a first mode of operation of the system.

Reference is now made to FIG. 1, which is a simplified partly pictorial, partly block-diagram illustration of a bandwidth policing system, constructed and operative in accordance with an exemplary embodiment of the present invention, the illustration depicting a first mode of operation of the system.

The system of FIG. 1, generally designated 100, comprises a plurality of leaf switches 102, which are generally top-of-rack (TOR) switches. For purposes of simplicity of description, only three leaf switches 104, 106, and 108 are shown in FIG. 1 a comprised in the plurality of leaf switches 102, it being appreciated that the plurality of leaf switches 102 may comprise a greater number of switches.

The system of FIG. 1 also comprises a spine switch 110; spine switches in general are connected to other spine switches or to leaf switches. For sake of simplicity of depiction and description, various levels of switches between the leaf switches 102 and the spine switch 110 are not shown, although they may be present in the system 100.

A plurality of packets 115 is shown as entering the plurality of leaf switches 102; the plurality of packets 115 shown is representative, it being appreciated that a much larger number of packets might be received.

Each of the plurality of packets 115 is shown as being part of a flow of packets; a flow in this context is a logical stream of packets, that would be policed according to a particular policy (the particular policy applying within an entire fabric, such as within a FatTree fabric; the fabric could, by way of non-limiting example, comprise all or only some of the leaf switches 102, or pre-defined switches which are expected to perform forwarding of the plurality of packets 115). The flows shown are:

Flow A 117; Flow B 119; and Flow C 121.

It is appreciated that, in practice, a greater or smaller number of flows might be present.

In each of the leaf switches 102, a polices is shown for controlling each of the flows, namely:

Policer A 125, controlling Flow A 117; Policer B 130, controlling (in other words, being bound to) Flow B 119; and Policer C 135, controlling Flow C 121, Generally, but not necessarily, each of Policer A 125, Policer B 130, and Policer C 125 stores a maximum bandwidth, and accumulated consumed bandwidth, for the corresponding flow, and is operative to drop packets once the maximum bandwidth has been exceeded.

Policer A 125, Policer B 130, and Policer C 135 are depicted by way of non-limiting example, it being appreciated that more (or fewer) policers may be present in the system 100.

In order to allow policing to take place at a global level, without the policing being necessarily restricted to a single switch, the spine switch 110 comprises the flowing global policers (by way of non-limiting example, it being appreciated that more (or fewer) global policers may be present in the system 100):

Global Policer A 140, globally controlling Flow A 117; Global Policer B 145, globally controlling Flow B 119; and Global Policer C 150, controlling Flow C 121.

FIG. 1 depicts a first mode of operation of the system 100 in which information regarding the state of each policer (Policer A 125, Policer B 130, and Policer C 135) in each of the leaf switches 102 is sent to the corresponding global policer (Global Policer A 140, Global Policer B 145, and Global Policer C 150), via logical connections 155.

Figure 2:
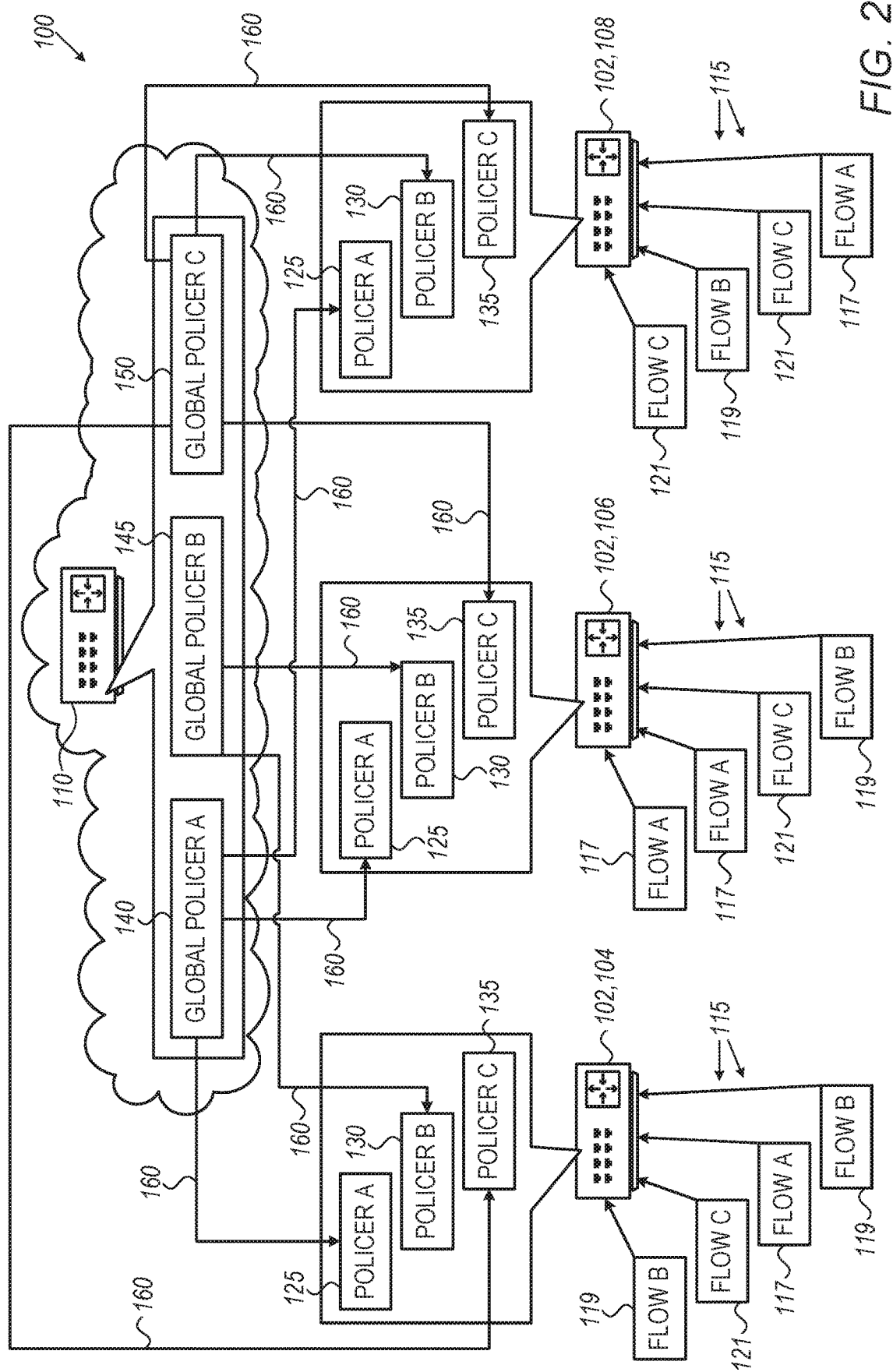
FIG. 2 is a simplified partly pictorial, partly block-diagram illustration of a bandwidth policing system, constructed and operative in accordance with an exemplary embodiment of the present invention, the illustration depicting a second mode of operation of the system.

FIG. 2 depicts a second mode of operation of the system 100 in which information regarding the global state (after aggregating all relevant information from policers in leaf switches 102 and determining, based thereon, a new global state) of each global policer (Global Policer A 140, Global Policer B 145, and Global Policer C 150) is sent to each of the corresponding local policers (Policer A 125, Policer B 130, and Policer C 135) in each of the leaf switches 102.

It is appreciated that the separate depiction and description of the first mode of operation and of the second mode of operation of the system 100 are provided for ease of depiction and description, it being appreciated that, in general, both modes of operation may take place simultaneously. It is appreciated that, in general, a rate at which the policers in the leaf switches 102 send data to the global policers, and the time that it takes the global policers to send new global state information back, as described above, may be taken to define system "granularity".

An exemplary mode of operation of the apparatus of FIGS. 1 and 2 is now briefly described.

As described, for example, in IETF RFC 2697 entitled "A Single Rate Three Color Marker", it is known to police traffic as follows. A meter meters a traffic stream and marks the packets in the stream according to three traffic parameters: Committed Information Rate (CIR); Committed Burst Size (CBS); and Excess Burst Size (EBS), to be either green, yellow, or red. A packet is marked green if it does not exceed the CBS, yellow if it does exceed the CBS, but not the EBS, and red otherwise.

In exemplary embodiments, when the above-described method of policing traffic is implemented in a switch, for example in any of the leaf switches 102 of FIG. 1, the traffic of each flow (Flow A 117; Flow B 119; and Flow C 121) is considered together across all incoming ports (not shown) of each leaf switch, and is considered separately by flow, with (by way of non-limiting example) each of Flow A 117, Flow B 119, and Flow C 121 being separately considered. Generally speaking, incoming packets are identified as belonging to a particular flow using an access control list. When the state (as described above) is "green" or "yellow", a count (token) is decremented from the policer associated with the given flow, and the incoming packet is processed; when the state is "red", the incoming packet is dropped. Each of Flow A 117, Flow B 119, and Flow C 121 may, by way of non-limiting example, represent: a different tenant; a different ULAN; or a different tunnel.

Figure 3:
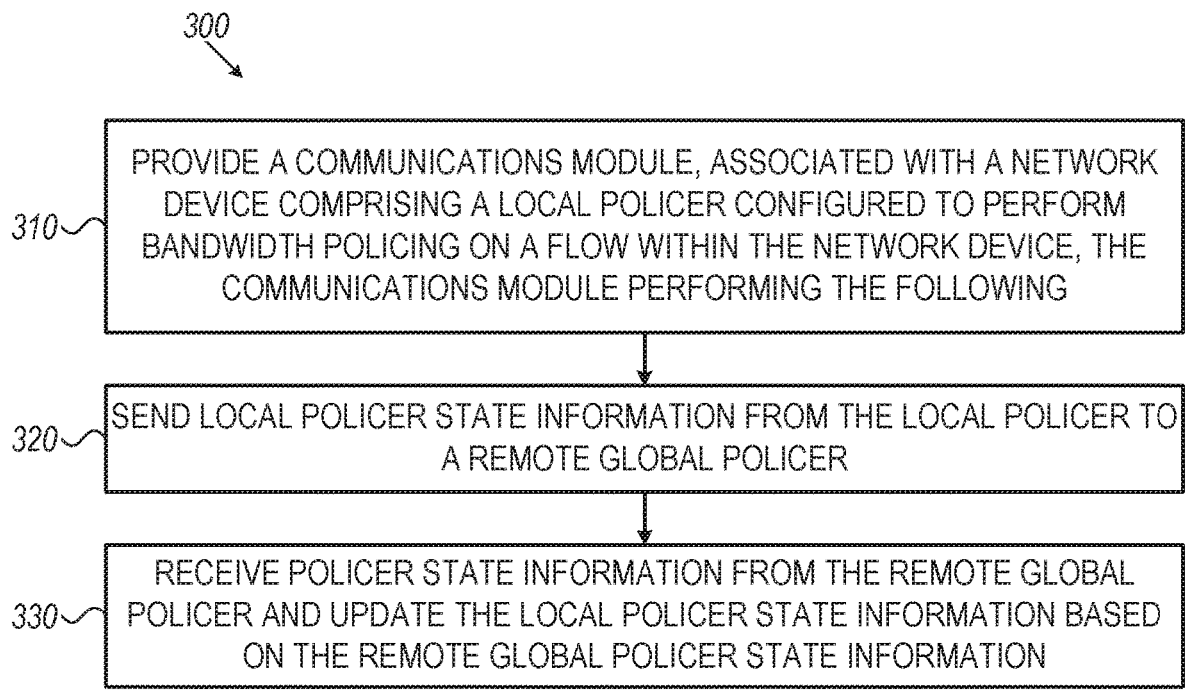
FIGS. 3 and 4 are simplified flowchart illustrations of exemplary modes of operation of the system of FIGS. 1 and 2.
Figure 4:
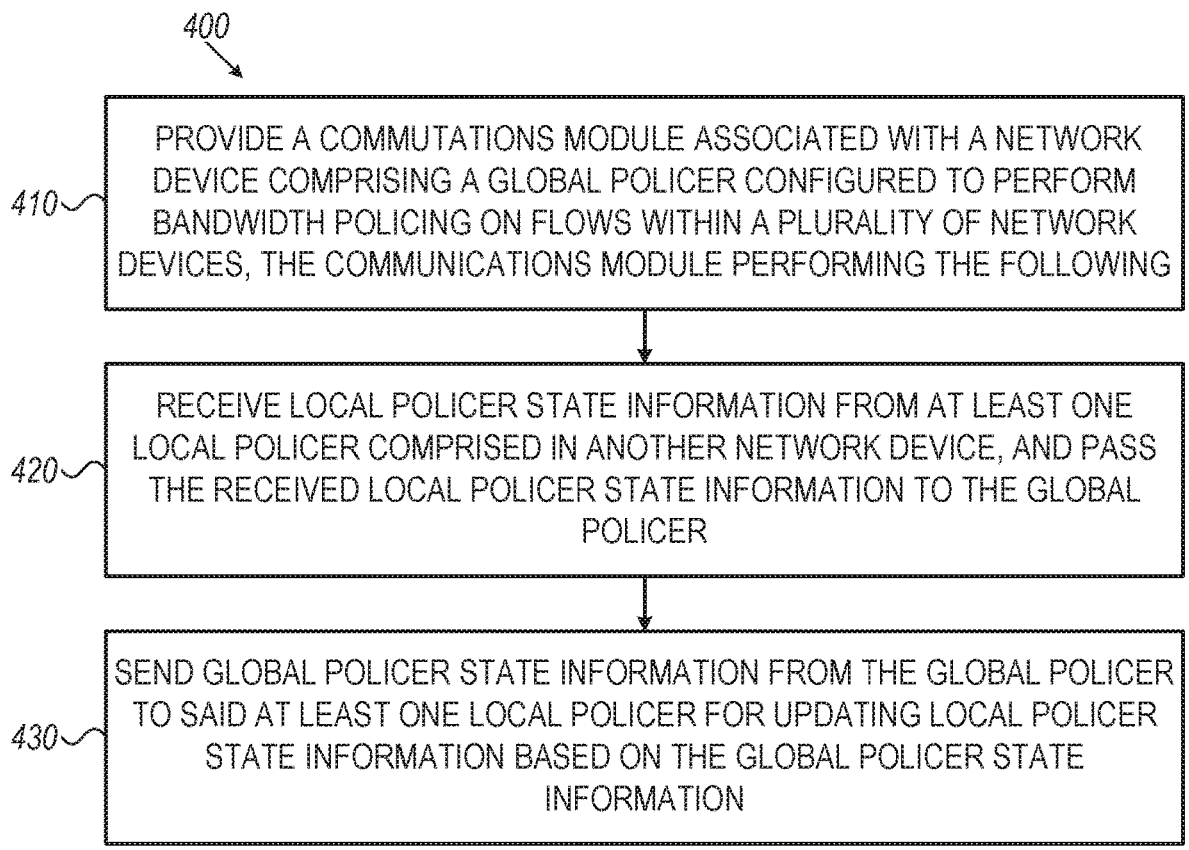

Reference is now made to FIGS. 3 and 4, which are simplified flowchart illustrations of exemplary modes of operation of the system of FIGS. 1 and 2.

The method of FIG. 3, generally designated 300, takes place in a network device (such as, by way of non-limiting example, a leaf switch, as described above). In step 310, a local policer for performing bandwidth policing is associated with (and may, in exemplary embodiments, be comprised in) the network device; the local policer cooperates with a communications module to perform the further steps (320, 330) of the method of FIG. 3.

In step 320, local policer state information is sent from the local policer to a remotely-located global policer. In step 330, policer state information is received from the remotely-located global policer, and the local policer state information is updated accordingly based on the received information.

It is appreciated that, for simplicity of description, the method of FIG. 3 has been described as if policing takes place for a single flow, it being appreciated that, as described above, a plurality of flows make in fact be subject to policing.

The method of FIG. 4, generally designated 400, also takes place in a network device (such as, by way of non-limiting example, a spine switch, as described above). In step 410, a global policer for performing bandwidth policing on flows from a plurality of network devices is associated with (and may, in exemplary embodiments, be comprised in) the network device; the global policer cooperates with a communications module to perform the further steps (420, 430) of the method of FIG. 4.

In step 420, local policer state information is received (in exemplary embodiments, at the communications module), from at least one local policer exemplary embodiments, from a plurality of local policers) comprised in another network device, and is passed on to the global policer.

In step 430, global policer state information (which, in exemplary embodiments, has been updated based on the received local policer state information) is sent (in exemplary embodiments, by the communications module) to the at least one local policer for updating local policer state information based on the global policer state information.

It is appreciated that, for simplicity of description, the method of FIG. 4 has been described as if policing takes place for a single flow, it being appreciated that, as described above, a plurality of flows make in fact be subject to policing.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. Apparatus for global traffic policing, comprising:
    a network device comprising a local policer configured to perform for each of a plurality of flows:
        store a maximum bandwidth for the flow,
        monitor an amount of bandwidth of the flow passing through the network device, and
        perform traffic policing on the flow within the network device at least in part by determining whether a current level bandwidth of the flow exceeds the stored maximum bandwidth for the flow; and
    a communications module configured to:
        send local policer state information, including the monitored amount of bandwidth passing through the network device, for each of the flows, from the local policer to a remote global policer; and receive remote global policer state information, including the current level bandwidth of each of the flows, from the remote global policer and update the local policer state information based on the received remote global policer state information.

2. Apparatus according to claim 1 and wherein the network device comprises a switch.

3. Apparatus according to claim 1 and wherein the network device comprises a network interface controller (NIC).

4. Apparatus according to claim 1 and wherein:
the local policer comprises a plurality of local policers, each associated with one of the plurality of flows; and
the communications module is configured to:
send local policer state information from each local policer to a corresponding remote global policer; and
receive policer state information from each remote global policer and update the corresponding local policer state information based on the corresponding remote policer state information, the local policer state information comprising a traffic parameter associated with each of the plurality of local policers, for marking a received packet in order to determine, at least in part, whether said received packet should be dropped.

5. Apparatus according to claim 1 and wherein the traffic policing comprises dropping at least one incoming packet, which has been marked, associated with the flow.

6. Apparatus according to claim 4 and wherein the traffic parameter comprises a three color marker.

7. Apparatus for global traffic policing in a network, the apparatus comprising:
a network device comprising a global policer; and
a communications module configured to:
receive local policer state information from a plurality of local policers in other network devices in the network, wherein the received information includes a monitored amount of bandwidth passing through the network device, for each of a plurality of flows,
aggregate the received state information into a current level bandwidth of each of the flows, and
send policer state information, including the current level bandwidth, from the global policer to said plurality of local policers for updating local policer state information based on the global policer state information.

8. Apparatus according to claim 7 and wherein:
the communications module is configured to:
receive local policer state information from each local policer, and pass the received local policer state information to a corresponding global policer; and
send policer state information from each global policer to each said local policer for updating local policer state information based on the corresponding global policer state information, including a traffic parameter for updating each of the plurality of local policers, the traffic parameter for marking a received packet in order to determine, at least in part, whether said received packet should be dropped.

9. Apparatus according to claim 7 and wherein the global policer is configured, in performing said traffic policing on flows with a plurality of network devices:
to maintain a policing quota and a current level for each of said flows;
to adjust said current level based on said received local policer state information; and to provide new policing quota information to said communications module as part of said policer state information.

10. Apparatus according to claim 8 and wherein the traffic parameter comprises a three color marker.

11. Apparatus according to claim 7, wherein the global policer is configured to receive local policer state information from a pre-defined set of switches expected to forward packets to be monitored, wherein the pre-defined set of switches includes fewer than all leaf switches in the network.

12. A method for global traffic policing in which a communications module, associated with a network device comprising a local policer is configured to perform traffic policing on each flow of a plurality of flows, the method comprising the network device performing the following for each of a plurality of flows:
storing a maximum bandwidth for the flow;
monitoring an amount of bandwidth of the flow passing through the network device;
sending local policer state information, including the monitored amount of bandwidth of the flow passing through the network device, from the local policer to a remote global policer; and
receiving policer state information, including a current level bandwidth of the flow, from the remote global policer and updating the local policer state information based on the received remote global policer state information,
wherein the local policer performs traffic policing at least in part by determining whether the current level bandwidth of the flow exceeds the stored maximum bandwidth for the flow.

13. The method according to claim 12 and wherein the network device comprises a switch.

14. The method according to claim 12 and wherein the network device comprises a network interface controller (NIC).

15. The method according to claim 12 and wherein:
the local policer comprises a plurality of local policers, each associated with one of the plurality of flows; and
the communications module performs the following:
sends local policer state information from each local policer to a corresponding remote global policer; and
receives policer state information from each remote global policer and updates the corresponding local policer state information based on the corresponding remote policer state information, including a traffic parameter for updating each of the plurality of local policers, the traffic parameter for marking a received packet in order to determine, at least in part, whether said received packet should be dropped.

16. The method according to claim 12 and wherein the traffic policing comprises dropping at least one incoming packet, which has been marked, associated with the flow.

17. A method according to claim 15 and wherein the traffic parameter comprises a three color marker.

18. A method for global traffic policing in a network, comprising:
receiving, by a communications module of a global policer in a network device, local policer state information from a plurality of local policers comprised in other network devices in the network, wherein the received information includes a monitored amount of bandwidth passing through the network device, for each of a plurality of flows;

aggregating the received state information into a current level bandwidth of each of the flows, by the global policer, and sending global policer state information, including the current level bandwidth, from the global policer to said plurality of local policers for updating local policer state information based on the global policer state information.

19. The method according to claim 18 and wherein:

the communications module performs the following:

receives local policer state information from each local policer, and passes the received local policer state information to a corresponding global policer; and sends policer state information from each global policer to each said local policer for updating local policer state information based on the corresponding global policer state information, including a traffic parameter for updating each of the plurality of local policers, the traffic parameter for marking a received packet in order to determine, at least in part, whether said received packet should be dropped.

20. The method according to claim 18 and wherein the global policer, in performing said traffic policing on flows with a plurality of network devices:

maintains a policing quota and a current level for each of said flows;

adjusts said current level based on said received local policer state information; and provides new policing quota information to said communications module as part of said policer state information.

21. A method according to claim 19 and wherein the traffic parameter comprises a three color marker.

* * * * *